Patented Oct. 12, 1954

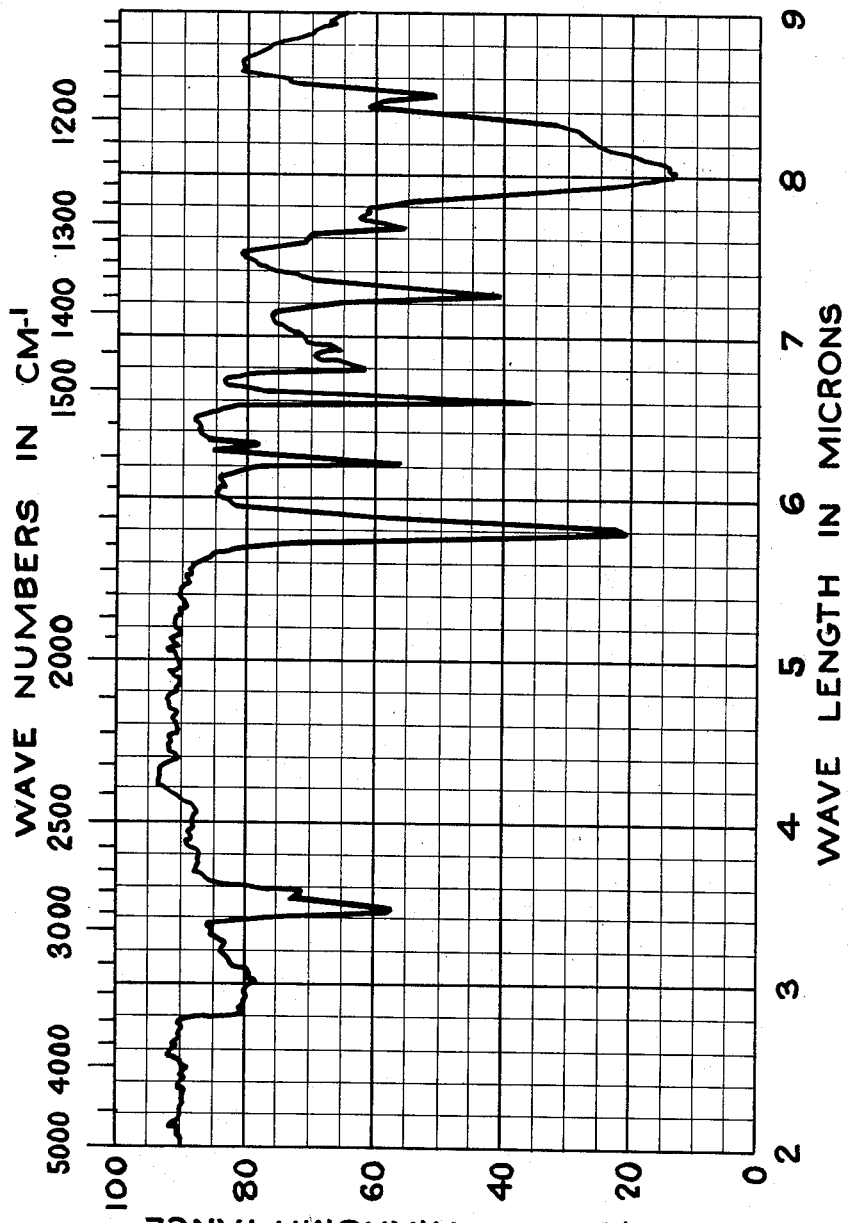

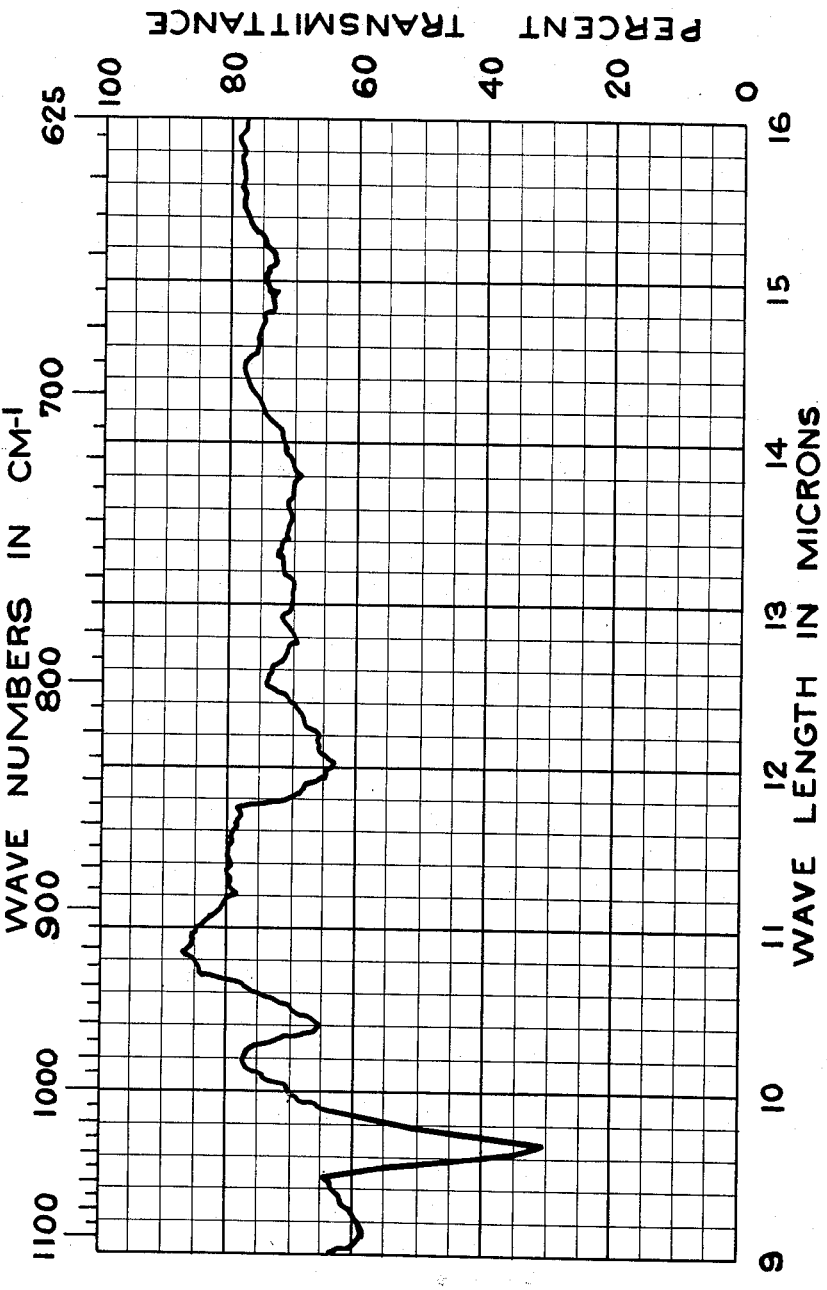

2,691,618

UNITED STATES PATENT OFFICE 2,691,618

ANTIMOCROBIAL AGENT AND PROCESS FOR PRODUCING SAME

Fred W. Tanner, Jr., Baldwin, N. Y., and John E. Lynch, East Paterson, and John B. Routien, Tenafly, N. J., assignors to Chas. Pfizer & Co., Inc., Brooklyn, N. Y., a corporation of Delaware Application June 5, 1953, Serial No. 359,766

8 Claims. (Cl. 167—65)

This invention relates to a new and useful antibiotic called anisomycin (also known by the trade-mark "Flagecidin"), and more particularly, to its production by fermentation, to methods for its recovery and concentration from crude solutions, such as fermentation broths, and to processes for its purification. The invention includes within its scope the antibiotic in dilute forms, as crude concentrates and in pure crystalline forms. These novel products are especially useful in combatting pathogenic microorganisms, particularly fungi and protozoa.

The new antibiotic is formed during the cultivation under controlled conditions of a new strain of a species of microorganism known as *Streptomyces griseolus*. The microorganism was identified by planting and testing cultures thereof on media normally used for such identification, and comparing the cultural characteristics with those described in Bergey's "Manual of Determinative Bacteriology," sixth edition (1948). The new strain of *S. griseolus* has been designated Isolate No. 14576-4 in the culture collection of Chas. Pfizer & Co., Inc., of Brooklyn, N. Y. A culture thereof has been deposited in the American Type Culture Collection, Washington, D. C., and added to its permanent collection of microorganisms as ATCC 11796.

The cultural characteristics of the new strain of *S. griseolus* are set forth in the following table. Except where otherwise noted, the results are based upon six replicates incubated for two weeks. The colors where R is written are those of Ridgway, "Color Standards and Nomenclature."

Table I.—Streptomyces griseolus ATCC 11796

| Medium | Amount of growth | Color — Aerial Mycelium and Sporulation | Color — Soluble Pigment | Remarks |
|---|---|---|---|---|
| Glucose asparagine agar | Moderate | Sporulation moderate, near Benzo Brown (R). | None | Creamy white reverse; spores Gram-positive, Measuring 1–1.3 (1.3) x 0.65 (1.0) x 1.3μ; in spirals. |
| Gelatin | do | Colonies creamy, white waxy; no sporulation, no aerial mycelium. | do | Liquefaction moderate. |
| Skimmed milk (28° C.) | do | Creamy white ring | Coral Pink (R) | No coagulation; hydrolysis; pH changing from 6.4 to 6.9. |
| Glucose agar | Good | White aerial mycelium; no sporulation. | Pinkish brown | Reverse medium brown. |
| Nutrient agar | Poor | Thin, flat, white aerial mycelium. | Very light brown | Reverse creamy white. |
| Calcium malate agar | Poor to moderate | White aerial mycelium; no sporulation. | None | Calcium malate digested; reverse creamy white. |
| Synthetic agar | Poor | Poor sporulation, near Pale Mouse Gray (R). | do | Reverse creamy white to light gray. |
| Emerson's agar | Moderate | Moderate sporulation, near Mouse Gray (R). | Light brown | Reverse light brown. |
| Cellulose | None | | | |
| Dextrose nitrate broth | Moderate | | | No reduction of nitrates. |
| Potato discs | Good | Sporulation darker than Mouse Gray (R). | Medium to dark brown | |
| Starch agar | Moderate | Sporulation near Benzo Brown (R). | None | Yellow subsurface growth; reverse light brown, narrow zone of hydrolysis. |

Our new strain of *S. griseolus* differs from the described strains thereof in several ways which are enumerated in the following table.

Table II

| Medium | S. griseolus ATCC 11796 | Bergey's Description |
|---|---|---|
| Gelatin | Colonies creamy, white waxy (in Petri dishes) | Yellowish, flaky pellicle and sediment (in gelatin stabs). |
| Synthetic agar | Poor Sporulation, near Mouse Gray (R); growth poor | Aerial mycelium at first gray, later becoming pallid, neutral-gray; colorless, thin growth, surface growth limited almost entirely to aerial mycelium. |
| Glucose agar | Good growth; white aerial mycelium; no sporulation | Spreading growth; center raised cream-colored, turning dark. |
| Litmus milk | (On skimmed milk at 28° C.) Moderate growth; creamy white ring; Coral Pink (R) soluble pigment; no coagulation; hydrolysis; pH becomes alkaline. | Abundant growth, pink pellicle; coagulated; peptonized; becoming alkaline. |
| Dextrose nitrate broth | No reduction to nitrites | Nitrites produced. |

It is to be understood that for the production of anisomycin the present invention is not limited to the aforesaid organism or to organisms fully answering the above description, which is given only for illustrative purposes. In fact, it is especially desired and intended to include the use of mutants produced from the described organism by various means, such as X-radiation, ultraviolet radiation, nitrogen mustards, and the like.

While anisomycin shows activity against a variety of microorganisms, as previously mentioned, it is particularly active against pathogenic protozoa and fungi. The following table illustrates the antibiotic spectrum of anisomycin through tests performed against a variety of such fungi. These tests were run by seeding nutrient broth containing various concentrations of the pure antibiotic with the particular organism specified and observing the concentrations at which no growth and growth, respectively, occurred. The antibiotic was employed in concentrations of 1, 10, 100 and 500 micrograms/milliliter (mcg./ml.). The test was conducted under standardized conditions.

Table III.—Spectrum of anisomycin, pathogenic fungi

| Organism | Concentration Anisomycin: mcg./ml. | |
|---|---|---|
| | Growth | No growth |
| Microsporum canis | 10 | 100 |
| Microsporum audouini | 10 | 100 |
| Histoplasma capsulatum | 10 | 100 |
| Cryptococcus neoformans | 1 | 10 |

| Organism | Concentration Anisomycin: mcg./ml. | |
|---|---|---|
| | Growth | No Growth |
| Trichophyton | 100 | 500 |
| Phialophora verrucosa | 100 | 500 |
| Blastomyces dermatiditis | >500 | |
| Sporotrichum schenkii | >500 | |
| Trichophyton violaceum | >500 | |
| Hormodendron compactum | >500 | |
| Blastomyces brasiliensis | >500 | |

The antifungal activity of anisomycin is further illustrated in Table IV, which shows the minimum concentration of antibiotic at which growth of various strains of Candida albicans failed to occur. This concentration is expressed as the "minimum inhibitory concentration" in mcg./ml. A standardized procedure was employed, similar to that described above with respect to Table III. The antifungal effectiveness of anisomycin in humans has not as yet been demonstrated.

Table IV.—Spectrum of anisomycin, Candida albicans

| Candida Albicans Strain No. | Minimum Inhibitory Concentration Anisomycin: mcg./ml. |
|---|---|
| 8 | 3.12 PI |
| 9 | 6.25 PI |
| 11 | 3.12 |
| 13 | 12.5 |

PI indicates partial inhibition.

The antiprotozoan activity of anisomycin was determined by innoculating tubes containing various concentrations of the antibiotic, with typical pathogenic protozoa, Trichomonas vaginalis and Endamoeba histolytica, and observing the degree of motility and/or growth of the microorganisms after incubation for 48 hours. For purposes of comparison, the same tests were employed with the antibiotic, fumagillin, which is known for its antiprotozoan activity. The results of these tests appear in Table V, wherein the ratings for activity against Trichomonas are based on the motility and growth observed in slides prepared from tubes incubated at the concentrations specified. In rating activity against Trichomonas, a figure of 4+ indicates complete inhibitory activity of the antibiotics tested, i. e., neither motility nor growth of the microorganism; 3+ indicates marked activity of the antibiotic, or slight motility and/or growth; 2+ indicates moderate activity; 1+ indicates slight activity; and (—) indicates no activity. Activity against Endamoeba was determined by comparing the number of cells in control tubes with the number of cells in tubes containing the antibiotics in the concentrations specified, the tubes being rated (+) for complete inhibitory activity and (—) for no activity.

Table V.—Anti-protozoan activity of anisomycin

| Antibiotic | Protozoa | Activity at Concentrations of— | | |
|---|---|---|---|---|
| | | 7.8 mcg./ml. | 3.9 mcg./ml. | 1.9 mcg./ml. |
| Anisomycin | Trichomonas | 4+ | 3+ | 2+ |
| Anisomycin | Endamoeba | + | + | + |
| Fumagillin | Trichomonas | 3+ | — | — |
| Fumagillin [1] | Endamoeba | — | — | — |

[1] No activity was observed below 15.6 mcg./ml.

It is apparent from the above table that anisomycin is highly active against the Trichomonas and Endamoeba. Furthermore, the results indicate that it is much more active against these organisms than is fumagillin.

No activity of anisomycin was demonstrated against the saprophytic mycobacteria when concentrations of the antibiotic ranging up to 100 mcg./ml. were tested against the species M. ranae, phlei, smegmatis, No. 607, berolinense and butyricum. Only slight activity was observed against various Gram-positive and Gram-negative microorganisms.

Anisomycin has been found to possess a relatively low level of toxicity when used in test animals. For example, the LD₀ value, when the antibiotic is administered intravenously to mice as a solution in water, is approximately 2 mg./20-gram mouse.

The invention includes within its scope processes for growing the microorganism S. griseolus ATCC 11796. The cultivation of the microorganism preferably takes place in aqueous nutrient media at a temperature of about 24–30° C., and under submerged conditions of agitation and aeration. Nutrient media which are useful for these processes include a carbohydrate, such as sugars, starch, glycerol, corn meal, and a source of organic nitrogen, such as casein, soybean meal, peanut meal, wheat gluten, cottonseed meal, lactalbumin, enzymatic digest of casein, tryptone. A source of growth substances, such as distillers' solubles, yeast extract, molasses fermentation residues, as well as mineral salts, such as sodium chloride, potassium phosphate, sodium nitrate, magnesium sulfate and trace minerals such as copper, zinc and iron may also be utilized with desirable results. If excessive foaming is encountered during the fermentation, anti-foaming agents, such as vegetable oils, may be added to the fermentation medium. The pH of the fermentation tends to remain rather constant, but, if variations are encountered, a buffering agent, such as calcium carbonate may also be added to the medium.

Inoculum for the preparation of anisomycin by the growth of *S. griseolus* may be obtained by employing growth from slants on such media as Emerson's agar or beef lactose. The growth may be used to inoculate either shaken flasks or inoculum tanks for submerged growth, or, alternatively, the inoculum tanks may be seeded from the shaken flasks. The growth of the microorganism usually reaches its maximum in about two or three days. However, variations in the equipment used, the rate of aeration, rate of stirring and so forth may affect the speed with which the maximum activity is reached. In general, the fermentation is continued until substantial antimicrobial activity is imparted to the medium, a period from about 24 hours to four days being sufficient for most purposes. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions must, of course, be maintained throughout the transfer of the inoculum and throughout the growth of the microorganism.

After growth of the microorganism, the mycelium, which is generally quite luxuriant and fine, may be removed from the fermentation broth by various standard equipment, such as filter-presses, centrifuges, and so forth. Thereafter, the antibiotic may be recovered from the fermentation broth by several different procedures. Alternatively, the whole broth may be used as is or it may be dried. The antibiotic may be further purified by various means; for instance, the compound may be extracted from aqueous solution at neutral or slightly alkaline pH's, preferably between about 6 and about 10, by means of a variety of water-immiscible organic solvents, including ethers, aromatic hydrocarbons, esters, ketones, lower alcohols, halogenated hydrocarbons, and mixtures thereof. Examples of these are diethyl ether, benzene, ethyl acetate, butyl acetate, methyl isobutyl ketone, butanol, and chloroform. The antibiotic may be extracted from most solvent solutions back into acidified water, preferably at a pH of below about 2.5. If desired, the solvent extract may be concentrated before extraction into acidified water. By adjustment of the pH to neutrality or alkalinity, the antibiotic may be re-extracted into one of the solvents indicated above. Upon drying the solvent and concentrating the solution, the antibiotic crystallizes in long white needles. The product may be recrystallized by cooling a solution thereof in hot butanol, ethyl acetate, benzene, or ethylene dichloride. Other methods of recovery which suggest themselves include absorption on charcoal with subsequent elution, treatment with ion exchange resins, and development on alumina columns.

Anisomycin is a basic, white organic compound that is soluble in dilute, aqueous acids, and moderately soluble in water. It is very soluble in a number of organic solvents, such as methyl alcohol, ethyl alcohol, acetone, dioxane and chloroform. It is insoluble in hexane, cyclohexane, carbon tetrachloride, and ether. The compound retains its stability for several hours at room temperature over a wide pH range. However, it is quite unstable on heating in acid solution. It is stable in a dry state or dissolved in dry solvents. The crystalline antibiotic base has a melting point at about 140–141° C. It exhibits three peaks in the ultraviolet region at 224, 277 and 283.5 m$\mu$, respectively (3.34 mg. in 25 ml. methanol). When dissolved in chloroform, the antibiotic shows a number of characteristic peaks in the infrared region, the more significant of which are at the following frequencies (in reciprocal centimeters): 3545, 3450, 3320, 2890, 2800, 1725, 1610, 1582, 1515, 1470, 1447, 1380, 1320, 1302, 1242, 1178, 1036, and 962. The infrared spectrum is more particularly illustrated in the attached drawings, wherein Fig. 1 shows the spectrum at frequencies from 5000 to 1100 cm.$^{-1}$ and Fig. 1a from 1100 to 625 cm.$^{-1}$. The base dissolved in methanol (C, 1%) and allowed to come to equilibrium has an $[\alpha]_D^{25}=-30.0°$. When dissolved in chloroform (C, 1%), its optical rotation is $[\alpha]_D^{25}=-45°\pm3°$.

A sample of anisomycin, which had been crystallized from ethyl acetate, was dried for three hours at 56° C. without loss in weight. The dried, crystalline antibiotic was then analyzed and found to be composed of the following elements in the proportions by weight specified:

| | |
|---|---|
| Carbon | 63.55 |
| Hydrogen | 7.27 |
| Nitrogen | 5.20 |
| Oxygen (by difference) | 23.98 |

This corresponds to the probable empirical formula $C_{14}H_{19}NO_4$ for the basic antibiotic.

Anisomycin is clearly distinguished from other antibiotics by its properties, as evidenced by those properties described above and by paper chromatography measurements. Useful salts of the antibiotic can be prepared by methods well known in the art, as by treatment of the base with the appropriate acid in aqueous solution or under anhydrous conditions. For instance, the hydrochloride can be prepared by dissolving the base in acetone and passing hydrogen chloride gas into the solution. Other acids, such as sulfuric, phosphoric acids, may be used to make the acid salts of the antibiotic.

The invention is further illustrated by the following example, which is not to be considered as imposing any limitation thereon.

*Example*

A nutrient medium was prepared from the following materials in one liter of water:

| | Grams |
|---|---|
| Glucose ("Cerelose") | 10 |
| Corn starch | 10 |
| Hydrolyzed casein ("N–Z Amine B") | 5 |
| Distillers' molasses solubles (Curbay BG) | 5 |
| Soybean meal | 15 |
| Sodium chloride | 1 |

After adjusting the mixture to a pH of 7 with potassium hydroxide, one gram of calcium carbonate was added, and steam was passed through the mixture for about 30 to 45 minutes to sterilize the same. A slant culture of the new strain of *S. griseolus* was transferred to 100 ml. of this medium in a 300 ml. Erlenmeyer flask and shaken 45 hours until good growth was obtained. Inoculum for a larger fermentation was prepared by transferring the contents of the aforesaid flask under aseptic conditions to one liter of the same medium in a 3 liter flask and shaking the same for 48 hours.

Fifty gallons of nutrient medium were prepared and sterilized as above indicated and innoculated with the inoculum thus prepared. The organism was then cultivated under submerged conditions of aeration and agitation for a period of three days. The fermentation broth was adjusted to a pH of about 2 with concentrated sulfuric acid, and filtered with Supercel to remove the mycelium. Next, the filtrate broth was adjusted to pH 9 with concentrated sodium hydroxide and twice extracted with 15 gallons of chloroform.

The combined chloroform extracts were concentrated and extracted with water acidified to pH 2 with concentrated sulfuric acid. Thereafter, the acidified aqueous solution was concentrated and readjusted to pH 9 with further sodium hydroxide. The antibiotic was re-extracted into chloroform which was evaporated to about a volume of 50 ml. Upon the addition of an equal volume of cyclohexane and further evaporation, the crude antibiotic was crystallized and recovered by filtration. The crude antibiotic was purified by dissolving the same in ethyl acetate, treating the resulting solution with absorbent carbon, and evaporating the ethyl acetate to obtain long white crystals of anisomycin.

Resort may be had to such modifications and equivalents as fall within the spirit of the invention and the scope of the appended claims.

What we claim is:

1. A process for producing anisomycin, which comprises cultivating the microorganism *Streptomyces griseolus* ATCC 11796 in an aqueous nutrient medium under submerged aerobic conditions until substantial antimicrobial activity is imparted to said medium.

2. A process as claimed in claim 1 wherein the anisomycin is recovered from the fermentation broth.

3. A process as claimed in claim 1 wherein anisomycin is recovered from the fermentation broth by filtering the broth and extracting it with a water-immiscible organic solvent selected from the group consisting of ethers, aromatic hydrocarbons, esters, ketones, lower alcohols, halogenated hydrocarbons and mixtures thereof, under neutral to alkaline pH conditions.

4. A process for producing anisomycin, which comprises cultivating *Streptomyces griseolus* ATCC 11796 in an aqueous nutrient medium under agitated submerged aerobic conditions at a temperature of from about 24° to about 30° C., for a period of from about one day to about four days.

5. A substance effective in inhibiting the growth of pathogenic protozoa and fungi, selected from the group consisting of a basic substance moderately soluble in water, very soluble in methyl alcohol, ethyl alcohol, acetone, dioxane and chloroform, insoluble in hexane, cyclohexane, carbon tetrachloride and ether, and capable of forming salts with acids; whose crystalline base contains the elements carbon, hydrogen, nitrogen and oxygen in substantially the following proportions by weight:

| | |
|---|---|
| Carbon | 63.55 |
| Hydrogen | 7.27 |
| Nitrogen | 5.20 |
| Oxygen (by difference) | 23.98 | whose crystalline base displays three peaks, at 224, 277 and 283.5 m$\mu$, respectively, in the ultraviolet region of the spectrum, when dissolved in chloroform (C, 1%) has the optical rotation $[\alpha]_D^{25} = -45° \pm 3°$, and when dissolved in chloroform, exhibits characteristic absorption in the infrared region at the following frequencies expressed in reciprocal centimeters: 3545, 3450, 3320, 2890, 2800, 1725, 1610, 1582, 1515, 1470, 1460, 1447, 1380, 1320, 1302, 1242, 1178, 1036 and 962; and the acid salts of said basic substance.

6. A basic substance effective in inhibiting the growth of pathogenic protozoa and fungi and capable of forming salts with acids; which basic substance is moderately soluble in water, very soluble in methyl alcohol, ethyl alcohol, acetone, dioxane and chloroform, insoluble in hexane, cyclohexane, carbon tetrachloride and ether, whose crystalline base contains the elements carbon, hydrogen, nitrogen, and oxygen in substantially the following proportions by weight:

| | |
|---|---|
| Carbon | 63.55 |
| Hydrogen | 7.27 |
| Nitrogen | 5.20 |
| Oxygen (by difference) | 23.98 | whose crystalline base displays three peaks at 224, 277 and 283.5 m$\mu$, respectively, in the ultraviolet region of the spectrum, when dissolved in chloroform (C, 1%) has the optical rotation $[\alpha]_D^{25} = -45° \pm 3°$, and when dissolved in chloroform, exhibits characteristic absorption in the infrared region at the following frequencies expressed in reciprocal centimeters: 3545, 3450, 3320, 2890, 2800, 1725, 1610, 1582, 1515, 1470, 1460, 1447, 1380, 1320, 1302, 1242, 1178, 1036 and 962.

7. An acid salt of the basic substance defined in claim 6.

8. A hydrochloride of the basic substance defined in claim 6.

References Cited in the file of this patent

UNITED STATES PATENTS

| Number | Name | Date |
|---|---|---|
| 2,378,876 | Waksman | June 19, 1945 |
| 2,482,055 | Duggar | Sept. 13, 1949 |
| 2,516,080 | Sobin et al. | July 18, 1950 |
| 2,617,755 | Benedict et al. | Nov. 11, 1952 |
| 2,649,401 | Haines et al. | Aug. 8, 1953 |
| 2,653,899 | Bunch et al. | Sept. 29, 1953 |

OTHER REFERENCES

Waksman: "The Actinomycetes," pub. by the Chronica Botanica Co., Waltham, Mass., 1950, pp. 116–117.

Seneca et al.: "Antibiotics and Chemotherapy," July 1952, pp. 357–360.

Hewitt et al.: "Antibiotics and Chemotherapy," August 1952, vol. 2, No. 8, pp. 409–410.

De Somer et al.: "Antibiotics and Chemotherapy," May 1954, pp. 546–550.